US011059334B2

(12) United States Patent
Corghi (10) Patent No.: US 11,059,334 B2
(45) Date of Patent: Jul. 13, 2021

(54) TYRE DISMOUNTING APPARATUS ADAPTED TO BE INSTALLED ON A MOTOR VEHICLE AND TYRE DISMOUNTING METHOD

(71) Applicant: NEXION S.p.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 358 days.

(21) Appl. No.: 15/982,430

(22) Filed: May 17, 2018

(65) Prior Publication Data

US 2018/0333995 A1 Nov. 22, 2018

(30) Foreign Application Priority Data

May 22, 2017 (IT) .......................... 102017000055380

(51) Int. Cl.
*B60C 25/05* (2006.01)
*B60P 3/14* (2006.01)
*B60C 25/138* (2006.01)

(52) U.S. Cl.
CPC ...... *B60C 25/0506* (2013.01); *B60C 25/0518* (2013.01); *B60C 25/0539* (2013.01);
(Continued)

(58) Field of Classification Search
CPC .................................................. B60C 25/0506
See application file for complete search history.

(56) References Cited

U.S. PATENT DOCUMENTS 8,915,285 B2 * 12/2014 Lawson .................. B60C 25/12
157/1.28
9,067,467 B2 6/2015 Corghi
(Continued)

FOREIGN PATENT DOCUMENTS

CN 201685667 U 12/2010
EP 1946946 A1 7/2008
(Continued)

OTHER PUBLICATIONS

Italy Search Report dated Feb. 1, 2018 (Application No. IT 102017000055380).

*Primary Examiner* — Brian D Keller
(74) *Attorney, Agent, or Firm* — The Dobrusin Law Firm, P.C.

(57) ABSTRACT

A tyre dismounting apparatus adapted to be installed on a motor vehicle comprises: a base configured to be fixed to the motor vehicle; a frame, hinged to the base and tiltable about a tilting axis between a rest position and a working position; a tilting actuator connected to the base and to the frame to move the frame relative to the base; a wheel-holder unit configured to receive a wheel and lock it in place and rotating about an axis of rotation to drive the wheel in rotation about the axis of rotation; a longitudinal actuator connected to the frame and configured to move the wheel-holder unit along a longitudinal axis having at least one component in a vertical direction, parallel to the direction of the weight force; a working unit connected to the frame and including a rod and a tool connected to the rod. The tyre dismounting apparatus comprises a transverse actuator connected to the working unit to move it translationally relative to the wheel-holder unit along a transverse axis parallel to the tilting axis of the frame.

20 Claims, 8 Drawing Sheets

(52) U.S. Cl.
CPC ...... *B60C 25/0542* (2013.01); *B60C 25/0581* (2013.01); *B60C 25/138* (2013.01); *B60P 3/14* (2013.01); *B60C 25/0521* (2013.01)

(56) References Cited

U.S. PATENT DOCUMENTS

| | | | |
|---|---|---|---|
| 2015/0298514 A1* | 10/2015 | Nicolini | B60C 25/138 157/1.24 |
| 2016/0114637 A1* | 4/2016 | Magnani | G01M 1/045 157/1.22 |
| 2016/0272022 A1 | 9/2016 | Corghi | |

FOREIGN PATENT DOCUMENTS

| | | |
|---|---|---|
| EP | 2514609 B1 | 4/2014 |
| EP | 2994324 A1 | 3/2016 |
| EP | 3156777 A1 | 4/2017 |
| IT | 1410791 | 4/2012 |
| IT | 102015902339467 | 2/2016 |
| JP | 2013-151217 A | 8/2013 |
| WO | 2014/181048 A1 | 11/2014 |
| WO | 2014/184645 A1 | 11/2014 |

* cited by examiner

TYRE DISMOUNTING APPARATUS ADAPTED TO BE INSTALLED ON A MOTOR VEHICLE AND TYRE DISMOUNTING METHOD

TECHNICAL FIELD OF THE INVENTION

This invention relates to a tyre dismounting apparatus adapted to be installed on a motor vehicle and to a tyre dismounting method.

The invention relates to tyre servicing equipment and, more specifically, to tyre dismounting apparatuses, that is, machines for dismounting tyres from wheel rims. The invention is applicable in particular to the field of emergency tyre services. The apparatus of this invention is used to dismount a tyre from a corresponding rim of a wheel of a heavy vehicle. Nevertheless, it may be used to dismount a tyre from a corresponding rim of a wheel of a light vehicle.

Apparatuses commonly used in this field are adapted to be installed on a motor vehicle such as, for example, but not necessarily, a van, and can be moved between a rest position, where they are tucked away inside the motor vehicle, and an operating position, where they are tilted at least partly out of the motor vehicle.

BACKGROUND OF THE INVENTION

Patent document EP2514609B1 discloses a tyre changing device adapted to be installed on a motor vehicle and having a wheel-holder unit with a drive shaft on which the wheel is set in rotation and which is perpendicular to the tilting axis of the apparatus when folded out of the motor vehicle. This feature makes the apparatus cumbersome, which means it must be installed so it opens out from the rear door of the motor vehicle. Thus, when wheel repair work is being done on a stationary vehicle on the road, the motor vehicle occupies a considerable amount of road space.

Known from patent document EP2994324B1 is another tyre dismounting apparatus adapted to be installed on a motor vehicle and having a wheel-holder unit with a drive shaft on which the wheel is set in rotation and which is parallel to the tilting axis of the apparatus when folded out of the motor vehicle. Thus, this apparatus can be installed so it opens out from a side door of the motor vehicle. In this apparatus, the wheel-holder unit can be translated along the drive shaft of the wheel-holder unit towards or away from a group of tools. Thus, when folded out of the motor vehicle in the working position, this apparatus projects from the motor vehicle and is raised off the ground. Consequently, when the tyre dismounting apparatus is in operation, the motor vehicle is unbalanced and lacks stability.

SUMMARY OF THE INVENTION

This invention has for an aim to overcome the above mentioned disadvantages of the prior art by providing a tyre dismounting apparatus adapted to be installed on a motor vehicle and a tyre dismounting method. This aim is fully achieved by the tyre dismounting apparatus adapted to be installed on a motor vehicle and by the tyre dismounting method which form the objects of this invention as characterized in the appended claims. This disclosure also covers a motor vehicle comprising a tyre dismounting apparatus.

The tyre dismounting apparatus is adapted to be installed on a motor vehicle. In one embodiment, the tyre dismounting apparatus comprises a base. The base is configured to be fixed to the motor vehicle.

In one embodiment, the tyre dismounting apparatus comprises a frame. The frame is hinged to the base. In one embodiment, the frame is tiltable about a tilting axis between a rest position and a working position. The tyre dismounting apparatus, in one embodiment, includes a tilting actuator connected to the base and to the frame to move the frame relative to the base.

In one embodiment, the tyre dismounting apparatus comprises a wheel-holder unit. The wheel-holder unit is connected to the frame. In one embodiment, the wheel-holder unit is configured to receive a wheel and lock it in place. In one embodiment, the wheel-holder unit is a self-centring chuck. In one embodiment, the wheel-holder unit is rotatable about an axis of rotation to drive the wheel in rotation about that axis of rotation.

In one embodiment, the wheel-holder unit moves along a longitudinal axis by means of a longitudinal actuator. In one embodiment, the longitudinal axis has at least one component in a vertical direction, parallel to the direction of the weight force.

In one embodiment, the tyre dismounting apparatus includes a working unit. The working unit is connected to the frame. The working unit, in one embodiment, includes a rod. The working unit, in one embodiment, includes a tool connected to the rod. In one embodiment, the working unit includes a plurality of tools.

More specifically, the tyre dismounting apparatus includes a transverse actuator. The transverse actuator is connected to the working unit to move it translationally relative to the wheel-holder unit along a transverse axis parallel to the tilting axis of the frame.

In one embodiment, the axis of rotation of the wheel-holder unit is parallel to the tilting axis. In one embodiment, the axis of rotation of the wheel-holder unit is perpendicular to the tilting axis. In this embodiment, the rod is positioned laterally relative to the wheel-holder unit. In this embodiment, the rod is at the same level as the wheel-holder unit along the vertical direction and is configured to move translationally towards and away from the wheel-holder unit.

In one embodiment, the frame comprises an arm, or beam. In one embodiment, the arm extends along the longitudinal axis. In one embodiment, the longitudinal axis has one component in the vertical direction and one component in a direction perpendicular to the vertical direction. In one embodiment, the arm only has a component in the vertical direction. In one embodiment, the arm lies in a working plane perpendicular to the tilting axis. In one embodiment, the wheel-holder unit is movably connected to the arm. In one embodiment, the longitudinal actuator is associated with the arm.

In one embodiment, the arm includes a longitudinal guide. In one embodiment, the wheel-holder unit is coupled to the longitudinal guide to be driven translationally along the guide by the longitudinal actuator.

In one embodiment, the frame comprises a crossbar. In one embodiment, the crossbar extends along the transverse axis. In one embodiment, the transverse axis is parallel to the tilting axis and perpendicular to the longitudinal axis. In one embodiment, the working unit is movably connected to the crossbar. In one embodiment, the transverse actuator is associated with the crossbar to drive the working unit in the transverse direction.

In one embodiment, the crossbar includes a transverse guide. In one embodiment, the crossbar includes a transverse slide. In one embodiment, the transverse slide is slidably coupled to the transverse guide and connected to the transverse actuator. In one embodiment, the working unit is associated with the transverse slide. In one embodiment, the transverse actuator is connected to the frame.

In one embodiment, the crossbar includes a manual guide. In one embodiment, the manual guide is associated with the transverse slide. In one embodiment, the working unit is movably connected to the manual guide to be driven transversely along the manual guide. In one embodiment, the working unit is movably connected to the manual guide to be rotated relative to the manual guide. The manual guide is configured to position the working unit manually at predetermined discrete positions. The operator chooses the discrete position at which to position the working unit according to the size of the tyre.

In one embodiment, the apparatus comprises a supporting foot. In one embodiment, the apparatus comprises a plurality of supporting feet. In one embodiment, the supporting foot is articulated to the frame. In one embodiment, the supporting foot has a first end connected to the frame and a second end, opposite to the first end. In one embodiment, the mass of the supporting foot is distributed in an unbalanced manner towards the second end. In one embodiment, the supporting foot is configured to swing about an axis parallel to the tilting axis. In one embodiment, the supporting foot is configured to come into contact with the ground and to support the weight of the frame at the working position. In one embodiment, the supporting foot is adjustable in length. In one embodiment, the supporting foot is telescopic. In one embodiment, the supporting foot is selectable from among different feet of differing lengths. Adjusting the length allows adapting the supporting foot to the level of the ground on which the foot is resting compared to its level when it is folded away in the vehicle it is installed in.

In one embodiment, the apparatus comprises a plurality of tools. The tools, in one embodiment, are interchangeable.

In one embodiment, at least one tool of the plurality of tools is configured to be removably connected to the rod. In this embodiment, the rod is configured to support only the tool that is in contact with the wheel. In another embodiment, at least one tool of the plurality of tools is configured to be removably connected to another tool of the plurality of tools. In this embodiment, the rod is configured to support at least two tools tool of the plurality of tools. The at least two tools comprise a load-bearing tool, connected to the rod, and a working tool, connected to the load-bearing tool and in contact with the wheel.

In one embodiment, the plurality of tools comprises a fin. The fin is of the type described in patent document 102015902339467, which is incorporated herein by reference. It is expressly understood that all the functional and structural features of the fin of Italian patent document 102015902339467 can be applied to the tyre dismounting apparatus according to this embodiment of it.

In one embodiment, referred to as the fin embodiment, the tool comprises a connecting element configured to connect the tool stably to the rod; a body having a first end and a second end which are spaced along a longitudinal axis of the fin, where the first end is directed along a first direction and is connected to the connecting element and the second end is directed along a second direction, opposite to the first direction; a supporting element integral with the body and extending along a transverse axis of the fin relative to the longitudinal axis of the fin and directed along a first direction, where the supporting element defines a supporting seat for a dismounting lever and has a protrusion projected along a working direction of the fin substantially perpendicular to a reference plane of the fin containing the longitudinal axis of the fin and the transverse axis of the fin; a transmission element, integral with the body and extending along the transverse axis of the fin in a second direction opposite to the first direction along which the supporting element extends; a fin connected to the body and protruding from the body in the working direction of the fin to define a guide surface inclined to a plane which is perpendicular to the reference plane of the fin and contains the longitudinal axis of the fin to come into contact with and guide a bead of the tyre and make it easier to insert into a groove defined by the rim.

In one embodiment, the plurality of tools comprises a claw. The claw is of the type described in patent document IT0001410791, which is incorporated herein by reference. It is expressly understood that all the functional and structural features of the claw of Italian patent document IT0001410791 can be applied to the tyre dismounting apparatus according to this embodiment of it.

In one embodiment, referred to as the claw embodiment, the tool comprises an elongate body and has a first end which is connectable to the rod and a second, hook-shaped end for gripping a bead of the tyre. The second end of the tool has a claw which is movable between a first operating configuration, where it projects in cantilever fashion from the elongate tool body to define the hooked shape, and a second operating configuration, where it is tucked in a lateral zone of the tool body to give the tool a hookless shape.

In one embodiment, the plurality of tools comprises a rotary head. The rotary head is of the type described in patent document EP1946946A1, which is incorporated herein by reference. It is expressly understood that all the functional and structural features of the rotary head of Italian patent document EP1946946A1 can be applied to the tyre dismounting apparatus according to this embodiment of it.

In one embodiment, the tool comprises a head which is rotatable about an axis and from which there project a mounting device, a dismounting device and a debeader device, located at positions such as not to interfere with each other and in such a way that rotating the head causes each of the three devices to reach a respective working position, in contact with the tyre. Associated with the head are locking elements to lock the head at three different positions, corresponding to the three working positions of the three devices.

In one embodiment, the apparatus comprises a portable roller table. The roller table is, in one embodiment, separate from the apparatus. The roller table is, in one embodiment, connected to the apparatus and designed to be pulled out from one side thereof. The roller table, in one embodiment, includes a supporting structure provided with elements for support on the ground. The roller table, in one embodiment, includes a plurality of rolling elements connected to the supporting structure and oriented in such a way that their axes of rotation are parallel to each other. The roller table is configured to facilitate moving the wheel closer to the apparatus. In one embodiment, where the wheel is moved closer to the wheel-holder unit from the front, each axis of rotation of each rolling element of the plurality of rolling elements is perpendicular to the axis of rotation of the wheel-holder unit. In another embodiment, where the wheel is moved closer to the wheel-holder unit from the side, each axis of rotation of each rolling element of the plurality of rolling elements is parallel to the axis of rotation of the wheel-holder unit.

At the working position, the distance of the wheel centre from the ground is, in one embodiment, less than the distance of the base from the ground. Thus, should the wheel accidentally fall while it is being dismounted, it will not cause injury to the operators involved because the wheel-holder unit it is mounted on is close to the ground. Furthermore, in this embodiment, access to the wheel is easier, making it more convenient for operators to work on it.

This disclosure also covers a motor vehicle comprising the tyre dismounting apparatus. In one embodiment, the base of the apparatus is fixed to the floorpan of the vehicle. In one embodiment, the floorpan of the vehicle itself constitutes the base of the apparatus.

This disclosure also covers a method for dismounting a tyre from a respective wheel rim.

In one embodiment, the method comprises a step of preparing a base fixed to the motor vehicle. In one embodiment, the method comprises a step of preparing a frame which is tiltable relative to the base about a tilting axis between a rest position and a working position.

In one embodiment, the method comprises a step of tilting the frame about the tilting axis from the rest position, where the frame is positioned inside the vehicle, to the working position, where at least part of the frame is positioned outside the vehicle.

In one embodiment, where the frame includes a supporting foot, the supporting foot, when the frame is at the working position, rests on the ground at a stationary position relative to movements of the wheel-holder unit and of the working unit during such movements.

In one embodiment, when the frame is tilted from the rest position to the working position, where the frame includes a supporting foot, the supporting foot swings about an axis parallel to the tilting axis, under the action of the weight force.

In one embodiment, where the frame includes a supporting foot, the method comprises a step of adjusting the length of the supporting foot. This adjustment is carried out to adapt the supporting foot to the shape of the ground it rests on.

In one embodiment, where the frame includes a supporting foot, the method comprises a step of resting the supporting foot on the ground.

In one embodiment, the method comprises a step of moving the wheel close to the wheel-holder unit. Moving the wheel close to the wheel-holder unit is accomplished by sliding the wheel on a roller table. The roller table has a ground-mounted structure located in proximity to the wheel-holder unit. In one embodiment, the roller table is provided with a plurality of rolling elements connected to the structure and oriented in such a way that their axes of rotation are parallel to each other and perpendicular to the axis of rotation of the wheel-holder unit to allow the wheel to slide towards the wheel-holder unit.

In one embodiment, the method comprises a step of receiving and locking the wheel in place by means of a wheel-holder unit connected to the frame. In one embodiment, the method comprises a step of self-centring the wheel on the wheel-holder unit.

In one embodiment, the method comprises a step of moving the wheel-holder unit along the longitudinal axis having at least one component in a vertical direction, parallel to the direction of the weight force, in order to lift the wheel off the ground. In one embodiment, the method comprises a step of lifting the wheel-holder unit.

In one embodiment, the method comprises a step of moving a working unit relative to the wheel-holder unit along a transverse axis parallel to the tilting axis by means of a transverse actuator, in order to allow a tool of the working unit to interact with the tyre on the wheel.

In one embodiment, the frame includes an arm extending along the longitudinal axis. In one embodiment, the wheel-holder unit is connected to the arm in such a way that the axis of rotation is parallel to the tilting axis. In one embodiment, when the frame is tilted from the rest position to the working position, the arm rotates while remaining in a plane perpendicular to the tilting axis.

In one embodiment, the step of moving the wheel-holder unit along the longitudinal axis is carried out by sliding a longitudinal slide with which the wheel-holder unit is associated along a longitudinal guide associated with the arm.

In one embodiment, the step of moving the working unit along the transverse axis is carried out by sliding a transverse slide with which the working unit is associated along a transverse guide associated with the crossbar.

In one embodiment, the method comprises a step of moving the working unit translationally along a manual guide. This translational movement comprises moving the working unit along the manual guide between a plurality of predetermined discrete positions. In one embodiment, the method comprises a step of rotating the working unit relative to the manual guide. This rotation comprises moving the working unit manually out of one of the predetermined discrete positions and into another of the predetermined discrete positions.

In one embodiment, the method comprises a step of removing a tool from the rod. In one embodiment, the method comprises a step of choosing the tool from a plurality of tools, comprising, for example, a fin, a claw or a rotary head. In one embodiment, the method comprises a step of connecting a tool to the rod. In one embodiment, the method comprises a step of connecting a tool to another tool which is in turn connected to the rod.

BRIEF DESCRIPTION OF THE DRAWINGS

This and other features will become more apparent from the following description of a preferred embodiment of the invention, illustrated by way of non-limiting example in the accompanying drawings, in which.

DESCRIPTION OF THE PREFERRED EMBODIMENTS

With reference to the accompanying drawings, the numeral 1 denotes a tyre dismounting apparatus, installed in a van, for mounting and dismounting a tyre to and from a corresponding wheel rim.

In one embodiment, the tyre dismounting apparatus 1 comprises a power generator 4. In one embodiment, the power generator 4 is built into the van. In another embodiment, the power generator 4 is movable relative to the van.

In one embodiment, the power generator comprises at least one electric battery. In one embodiment, the power generator comprises a plurality of electric batteries. In one embodiment, the plurality of electric batteries is a plurality of lithium batteries. In another embodiment, the plurality of electric batteries is a plurality of lead batteries.

In another embodiment, the power generator is an electricity generating set. The electricity generating set converts the mechanical energy of the van's internal combustion engine into electrical energy for the tyre dismounting apparatus 1.

In one embodiment, the tyre dismounting apparatus 1 comprises a hydraulic pumping unit 5. In one embodiment, the hydraulic pumping unit 5 is built into the van. In one embodiment, the hydraulic pumping unit 5 is movable relative to the van.

In one embodiment, the tyre dismounting apparatus 1 comprises a control device 6. The control device 6 is configured to regulate the hydraulic pressure in the tyre dismounting apparatus. In one embodiment, the control device 6 is connected to the tyre dismounting apparatus by a connecting circuit. In another embodiment, the control device 6 is connected to the tyre dismounting apparatus by a wireless connection.

In one embodiment, the tyre dismounting apparatus 1 comprises a base 3. The base 3 is built into the van.

In one embodiment, the base 3 comprises a metal plate which is welded or bolted to the van. In one embodiment the metal plate comprises a plurality di hinges 301. In one embodiment, the base 3 is constituted by the plurality of hinges 301 which are welded or bolted directly to the van's floorpan.

In one embodiment, illustrated in the drawings, the base 3 comprises two hinges 301.

In one embodiment, the tyre dismounting apparatus 1 comprises a frame 2.

In one embodiment, the base 3 is connected to the frame 2 of the tyre dismounting apparatus 1.

The plurality of hinges 301 defines connection points between the frame 2 and the bae 3. In one embodiment, the base 3 and the frame 2 are hinged to each other by two hinges 301.

In one embodiment, the frame 2 is tiltable about a tilting axis Z. The tilting axis Z is the axis which passes through at least two hinges 301 of the plurality of hinges 301 of the base 3.

In one embodiment, the hinges 301 are positioned on the base 3 in such a way that the tilting axis Z is substantially perpendicular to a side of the van. In another embodiment, the hinges 301 are positioned on the base 3 in such a way that the tilting axis Z is substantially parallel to a side of the van.

In one embodiment, tilting the frame 2 about the tilting axis Z defines two positions of the frame 2 relative to the van: a rest position and a working position. At the rest position, the tyre dismounting apparatus 1 is entirely contained within the van. At the working position, at least part of the frame 2 is outside the van.

In one embodiment, the tyre dismounting apparatus 1 comprises a tilting actuator 7. The tilting actuator 7 is configured to allow tilting the frame 2 from the rest position to the working position. In one embodiment, the tilting actuator 7 is a hydraulic cylinder.

Figure 6:
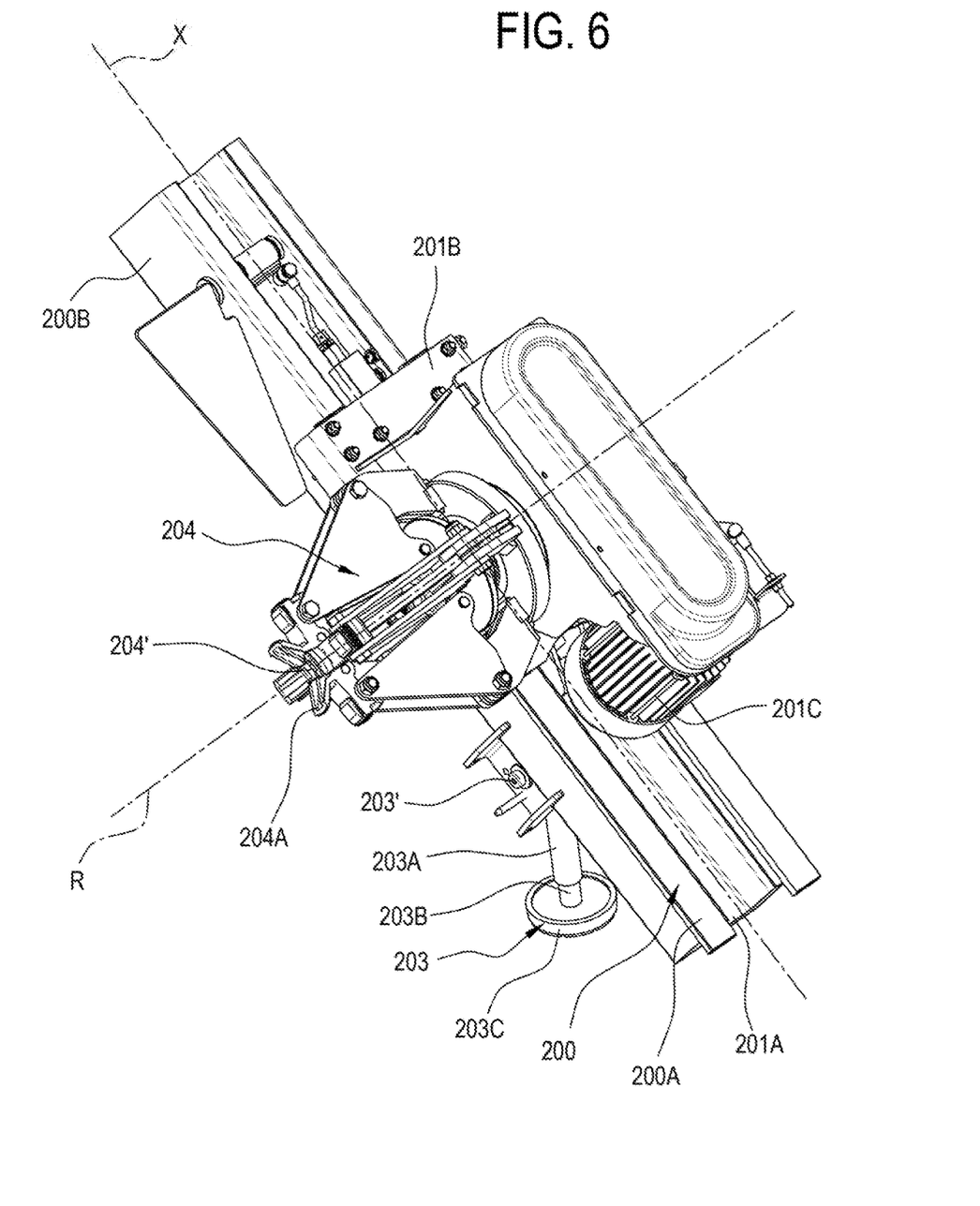
FIG. 6 is a perspective view of an arm of the frame.

In one embodiment, the frame 2 comprises an arm 200. In one embodiment, illustrated in the drawings, the arm 200 of the frame 2 is elongate along a longitudinal axis X, perpendicular to the tilting axis Z. The arm 200 has a first end 200A which is free and distal from the base 3 on the van and a second end 200B which is close to the base 3 of the van. In one embodiment, the longitudinal axis X has at least one component in the vertical direction, parallel to the direction of the weight force. At the working position, the first end 200A is lower down along the vertical direction than the second end 200B.

Figure 7:
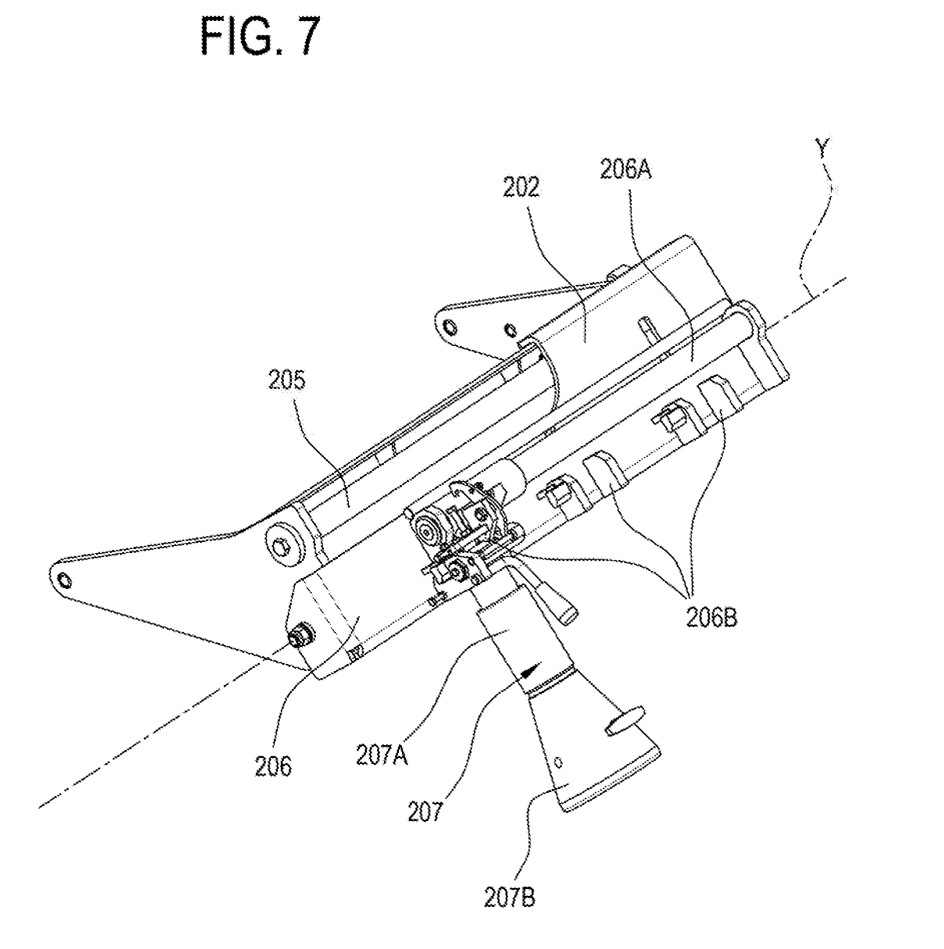
FIG. 7 is a perspective view of a crossbar of the frame.

In one embodiment, the frame 2 comprises a crossbar 202. In one embodiment, illustrated in the drawings, the crossbar 202 of the frame 2 extends along a transverse axis Y, parallel to the tilting axis Z. In one embodiment, the crossbar 202 is linked to the second end 200B of the arm 200. Thus, in this embodiment, the arm 200 and the crossbar 202 are positioned relative to each other in such a way that the frame 2 is substantially in the shape of an "L".

Figure 1:
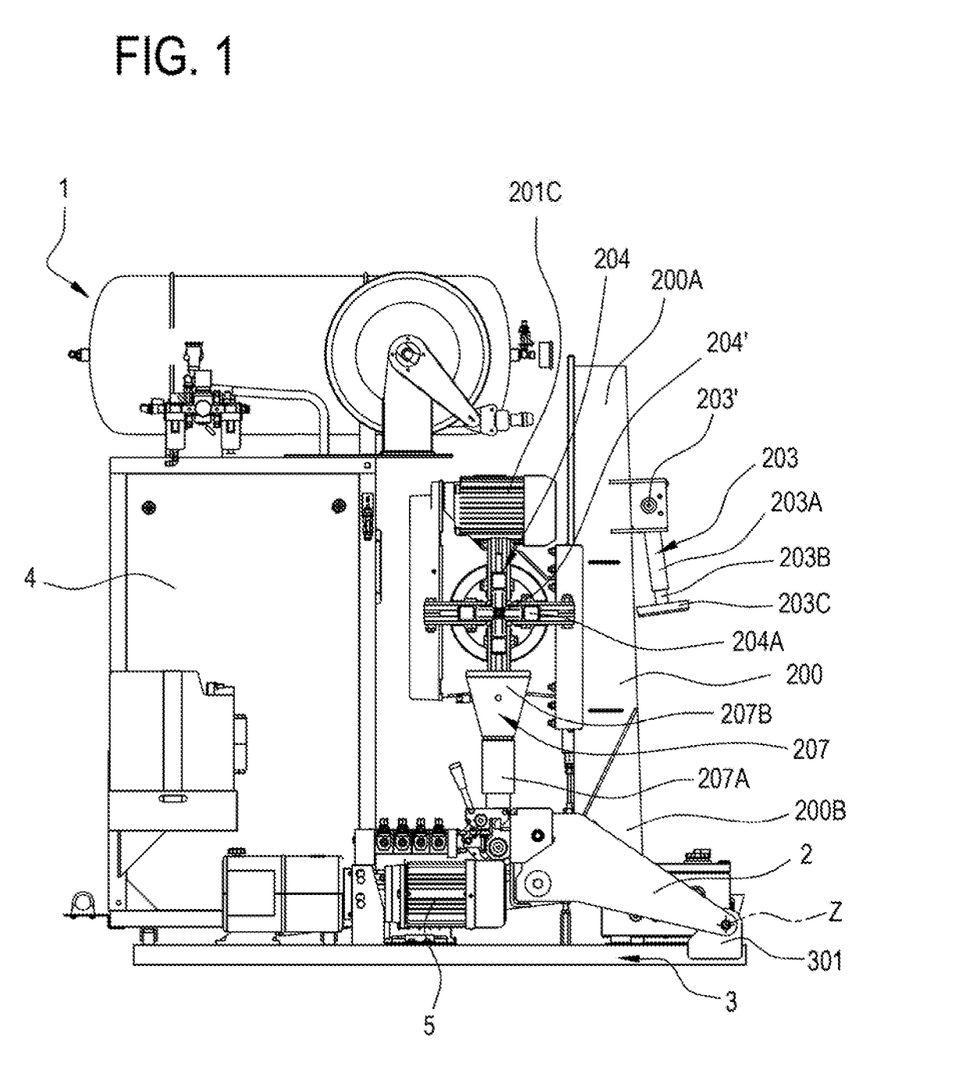
FIG. 1 is a side view of a tyre dismounting apparatus forming the object of this disclosure, at a rest position.
Figure 2:
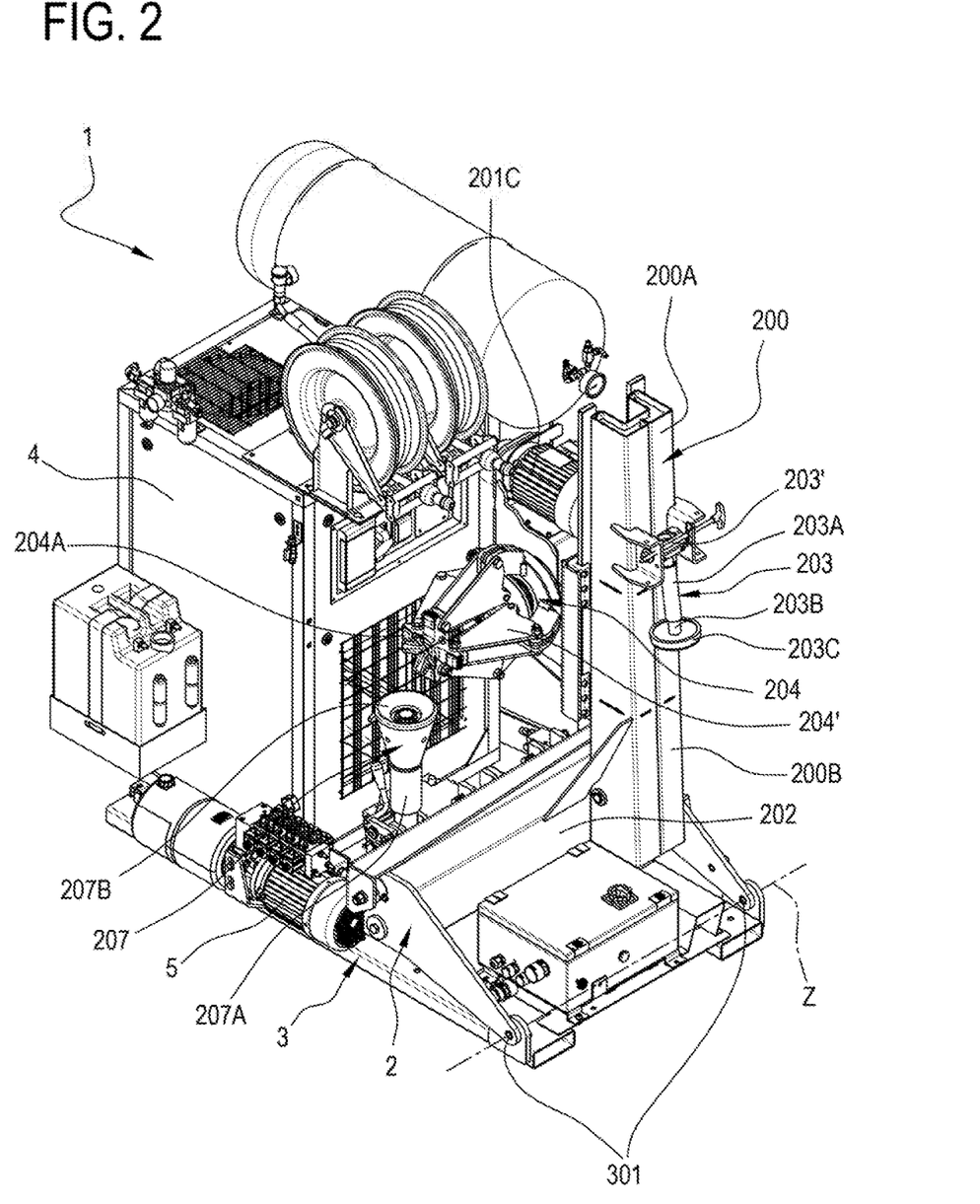
FIG. 2 is a perspective view of the tyre dismounting apparatus of FIG. 1, at a rest position.
Figure 3:
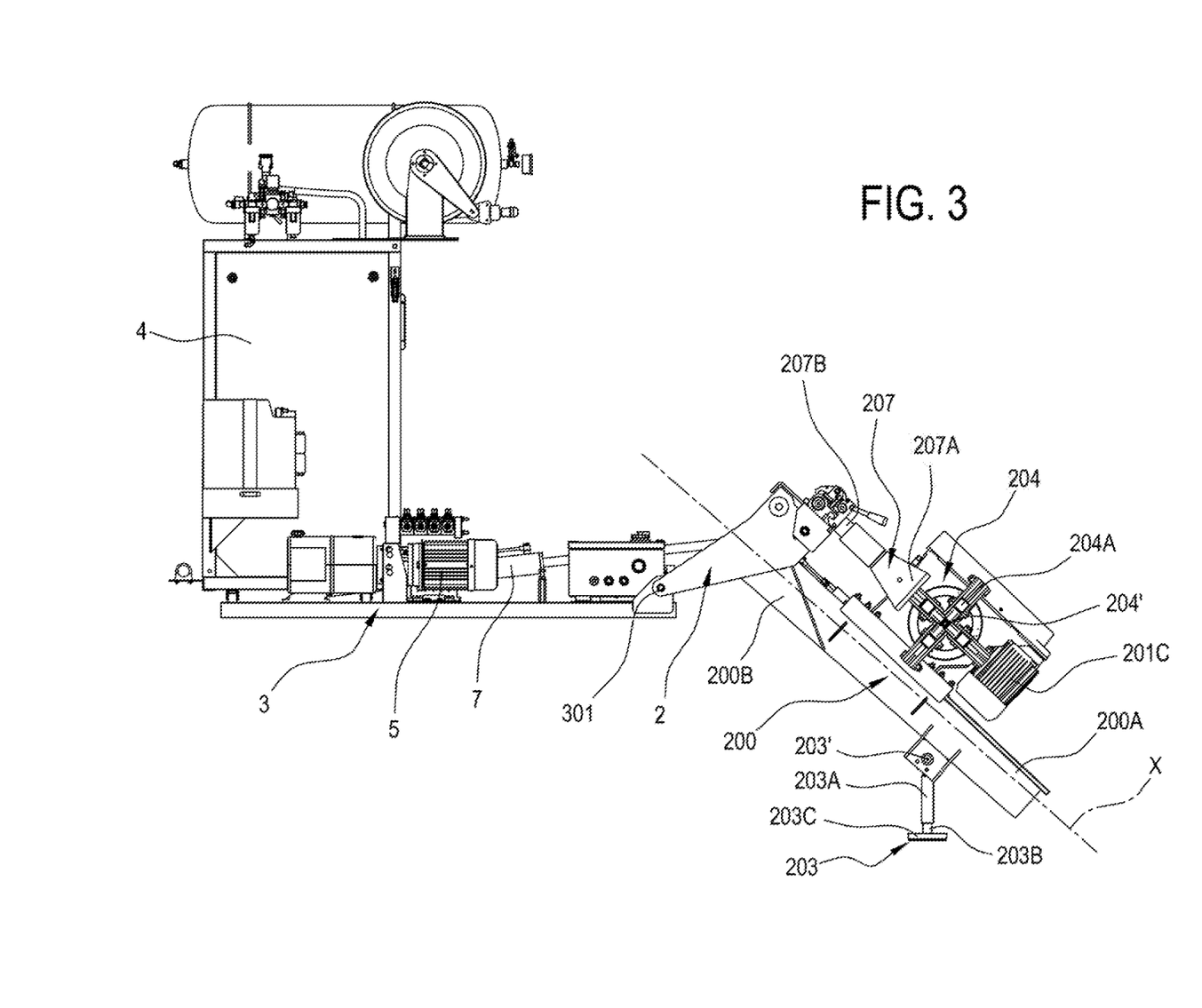
FIG. 3 is a side view of the tyre dismounting apparatus of FIG. 1, at a working position.
Figure 4:
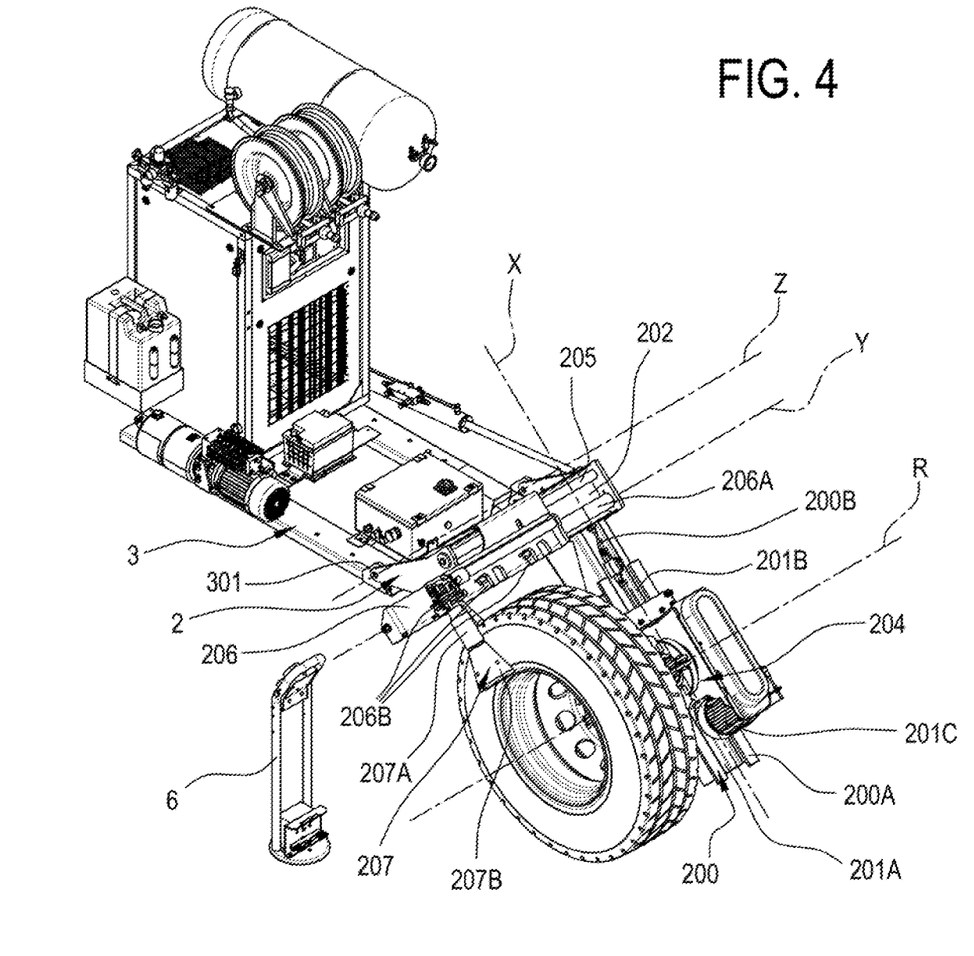
FIG. 4 is a perspective view of the tyre dismounting apparatus of FIG. 1, at a working position.
Figure 5:
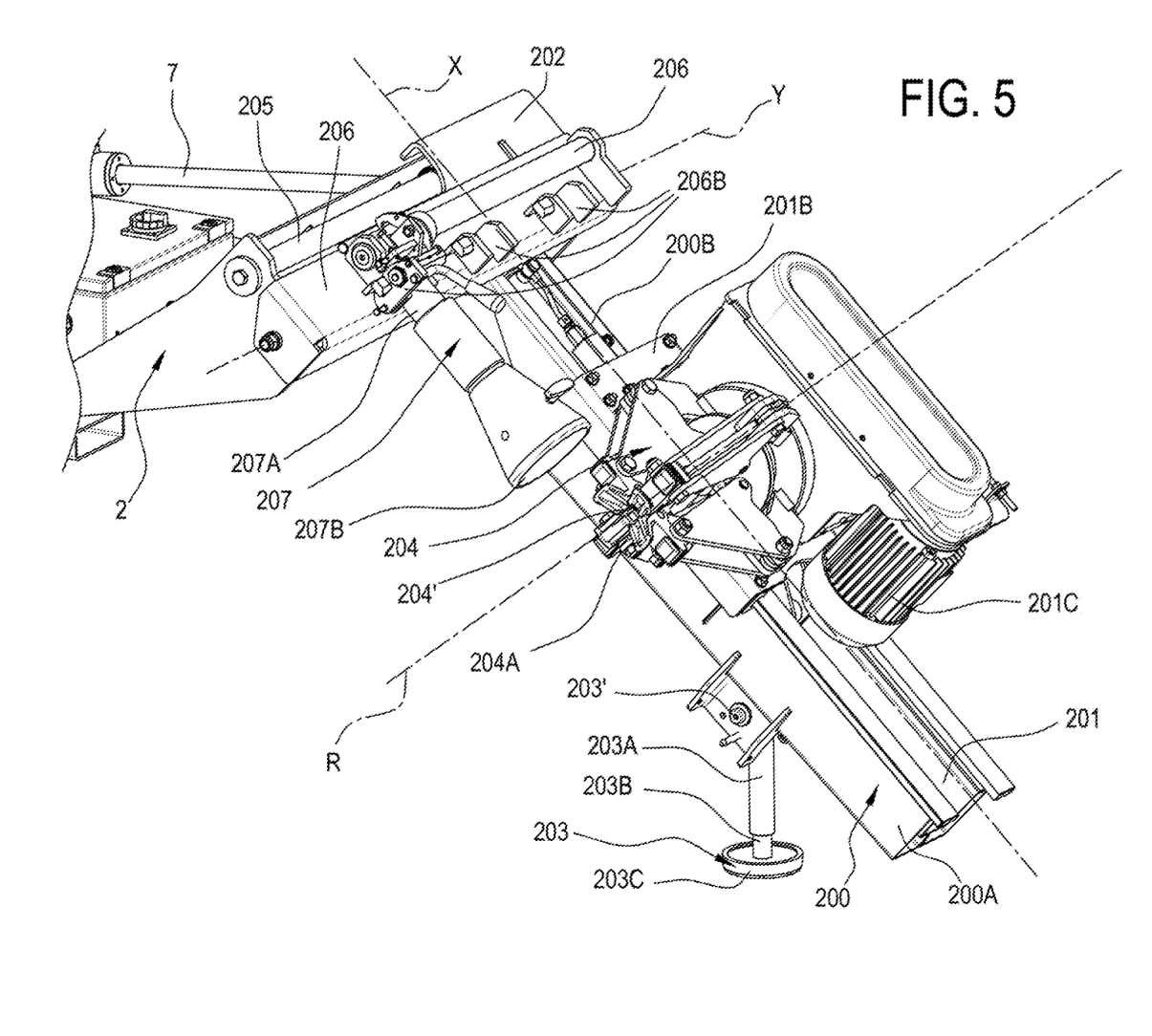
FIG. 5 illustrates a detail of the frame of the tyre dismounting apparatus of FIG. 1.

In one embodiment, the frame 2 comprises a supporting foot 203. In one embodiment, the supporting foot 203 is linked to the second end 200B of the arm 200 by means of a supporting hinge 203'. In one embodiment, the supporting foot 203 can swing about an axis of oscillation parallel to the tilting axis Z and passing through the supporting hinge 203'. In one embodiment, the supporting foot 203 comprises two parts: a hollow rod 203A, comprising an internal thread, hinged to the arm 200; a solid rod 203B, comprising an external thread and a plate 203C at the end of it which is operatively rested on the ground. The plate 203C of the supporting foot 203 is configured to come into contact with the ground when the frame 2 is at the working position.

In one embodiment, the mass of the supporting foot is distributed in an unbalanced manner towards the plate 203C. In this embodiment, the supporting foot 203 remains substantially vertical, parallel to the direction of the weight force.

In one embodiment, the hollow rod 203A and the solid rod 203B are coupled to each other in such a way as to allow the supporting foot 203 to be adjusted in height.

In one embodiment the arm 200 comprises a longitudinal guide 201A and a longitudinal slide 201B. The longitudinal slide 201B is connected to the longitudinal guide 201A by a prismatic link which allows the longitudinal slide 201B to move translationally relative to the longitudinal guide 201A. In one embodiment, the longitudinal slide 201B moves translationally along the longitudinal axis X. In one embodiment, the longitudinal axis X has at least one vertical component, parallel to the direction of the weight force.

In one embodiment, the arm 200 comprises a longitudinal actuator 201C. The longitudinal actuator 201C is configured to allow the longitudinal slide 201B to move translationally on the longitudinal guide 201A. In one embodiment, the longitudinal actuator 201C is a hydraulic cylinder.

In one embodiment, the tyre dismounting apparatus 1 comprises a wheel-holder unit 204. The wheel-holder unit 204 is connected to the longitudinal slide 201B. In one embodiment, the wheel-holder unit 204 is welded to the longitudinal slide 201B. In another embodiment, the wheel-holder unit 204 is bolted to the longitudinal slide 201B.

Being connected to the longitudinal slide 201B, the wheel-holder unit 204 is, in one embodiment, movable translationally along the longitudinal axis X. The translational movement of the wheel-holder unit 204 allows defining two operating configurations of the wheel-holder unit 204: an engagement configuration and a working configuration. In the engagement configuration, the wheel-holder unit 204 is positioned substantially on the first end 200A of the arm 200 at a position close to the ground. In one embodiment, the wheel-holder unit 204, when in the engagement configuration, does not reach the first end 200A of the arm 200 but remains at a position close to the first end 200A. In this configuration, the wheel-holder unit 204, being close to the ground, is configured to engage and lock a wheel to be serviced. In the working configuration, the wheel-holder unit 204 may be at a working position between the first end 200A and the second end 200B of the arm 200.

In one embodiment, the wheel-holder unit 204 comprises a self-centring chuck 204'. The self-centring chuck 204' rotates about an axis of rotation R. In one embodiment the axis of rotation R of the self-centring chuck 204' is perpendicular to the tilting axis Z. In another embodiment, illustrated in the drawings, the axis of rotation R of the self-centring chuck 204' is parallel to the tilting axis Z.

The self-centring chuck 204' comprises a plurality of locking elements 204A. In one embodiment, the self-centring chuck 204' comprises four locking elements 204A. The locking elements 204A are configured to engage the wheel, translate it in a radial direction relative to the axis of rotation R of the self-centring chuck 204' and lock it in place. The wheel-holder unit 204 comprises a locking actuator. In one embodiment, the locking actuator is configured to allow radially translating the locking elements 204A. The wheel-holder unit 204 comprises a rotary actuator. In one embodiment, the rotary actuator is configured to allow the wheel to rotate when the wheel is centred and locked on the self-centring chuck 204'.

In a further embodiment, the locking actuator and the rotary actuator coincide.

In one embodiment, the wheel-holder unit 204 comprises an adapter system.

In one embodiment, the adapter system comprises an adapter and a built-in chuck. In one embodiment, the adapter is locked on the self-centring chuck 204'. The built-in chuck is linked to the adapter. By varying the features of the built-in chuck, this makes it possible to service wheels of different types.

In one embodiment, the crossbar 202 comprises a transverse guide 205 and a transverse slide 206. The transverse slide 206 is connected to the transverse guide 205 by a prismatic link which allows the transverse slide 206 to move translationally relative to the transverse guide 205.

In one embodiment, the transverse slide 206 moves translationally along a transverse axis Y.

In one embodiment, the crossbar 202 comprises a transverse actuator. The transverse actuator is configured to allow the transverse slide 206 to move translationally on the transverse guide 205. In one embodiment, the transverse actuator is a hydraulic cylinder.

In one embodiment, the transverse slide 206 comprises a manual guide 206A. In one embodiment, the manual guide 206A is a cylindrical beam. In one embodiment, the transverse slide 206 comprises a plurality of housings 206B. The plurality of housings 206B are disposed on the transverse slide 206 along the transverse axis Y.

In one embodiment, the tyre dismounting apparatus 1 comprises a working unit 207.

The plurality of housings 206B allows the working unit 207 to be pre-positioned at an intermediate position selected from a plurality of discrete positions along the transverse axis Y. The pre-positioning of the working unit 207 makes the apparatus more readily adaptable. In other words, in one embodiment, the working unit 207 is configured to undergo a first manual adjustment using the manual guide 206A up to the intermediate position in one of the housings 206B of the plurality of housings 206B. In one embodiment, the first adjustment is a function of the diameter of the wheel to be serviced. The working unit is then configured to be further moved translationally by the transverse actuator along the transverse axis Y until it meets tyre on the wheel. This translational movement along the transverse axis Y requires less time than a system with a working unit 207 that does not have the pre-positioning feature.

The working unit 207 is positioned on the transverse slide 206 and connected by a prismatic link to the manual guide 206A. The working unit 207 comprises a rod 207A and a tool 207B which is removably connected to the rod 207A.

In one embodiment, the working unit 207 is moved translationally by the transverse actuator along a direction parallel to the tilting axis Z. In one embodiment, the working unit 207 is moved translationally along a direction parallel to the tilting axis Z by a manual adjustment carried out by shifting the working unit 207 along the manual guide 206A. In other words, the translational movement of the working unit 207 along the transverse axis Y is the result of two components: one due to the action of the transverse actuator on the transverse slide 206 and one due to the manual adjustment of the working unit 207 on the manual guide 206A.

In one embodiment, the working unit 207 is housed in one of the housings of the plurality of housings 206B.

In one embodiment, the working unit 207 rotates about the manual guide 206A.

The rotation of the working unit 207 about the manual guide 206A defines two positions: a position of interference and a position of non-interference. In the position of interference, the working unit 207, as it moves translationally along the transverse axis Y in the direction towards the wheel-holder unit 204, intercepts a wheel engaged by the wheel-holder unit 204.

In the position of non-interference, the working unit 207, as it moves translationally along the transverse axis Y in the direction towards the wheel-holder unit 204, does not intercept a wheel engaged by the wheel-holder unit 204.

Figure 8:
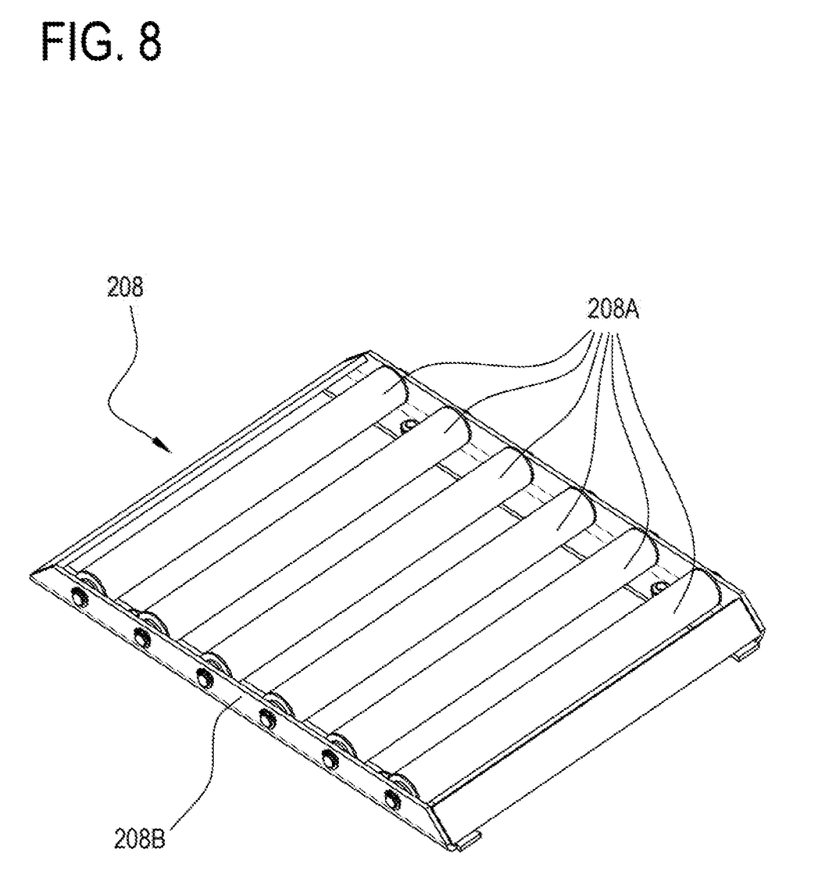
FIG. 8 is a perspective view of a roller table.

In one embodiment, the tyre dismounting apparatus 1 comprises a roller table 208 configured to facilitate moving a wheel close to the wheel-holder unit.

In one embodiment, the roller table facilitates moving the wheel towards the wheel-holder unit in a direction parallel to the axis of the wheel-holder unit.

In one embodiment, the roller table 208 is portable. By "portable" is meant that the roller table 208 can be moved independently of the other components of the tyre dismounting apparatus. In another embodiment, the roller table 208 is attached to the frame 2 of the tyre dismounting apparatus 1.

In one embodiment, the roller table 208 comprises a plurality of rolling elements 208A. In one embodiment, the rolling elements 208A are rotating cylinders. The axis of rotation of each rotary cylinder is parallel to the axes of rotation of the other rotary cylinders. In one embodiment, the roller table 208 comprises a supporting structure 208B. In one embodiment, the supporting structure 208B is connected to the rolling elements 208A. In one embodiment, the supporting structure 208B comprises a plurality of points for support on the ground.

In one embodiment, the tyre dismounting apparatus 1 comprises a wheel-mounted trolley to facilitate moving a wheel close to the wheel-holder unit.

In one embodiment, the tyre dismounting apparatus comprises a power distribution system to convey the pressurized hydraulic fluid to each of the above mentioned actuators.

This disclosure also provides a motor vehicle, which by way of non-limiting example, may be a van, equipped with the tyre dismounting apparatus 1.

In one embodiment, the tyre dismounting apparatus 1 can be transported in the motor vehicle. In one embodiment, the base 3 of the tyre dismounting apparatus 1 is connected to the motor vehicle in such a way that the frame 2, at the working position, protrudes from a rear door of the motor vehicle. In this embodiment, the tilting axis Z is substantially perpendicular to the vehicle's direction of travel. In another embodiment, the base 3 of the tyre dismounting apparatus 1 is connected to the motor vehicle in such a way that the frame 2, at the working position, protrudes from a side door of the motor vehicle. In this embodiment, the tilting axis Z is substantially parallel to the vehicle's direction of travel.

This disclosure also provides a method for dismounting a tyre from a corresponding wheel rim.

In one embodiment, the method comprises a step of preparing a base 3, fixed to a motor vehicle, and a frame 2 which is tiltable relative to the base 3 about a tilting axis Z between a rest position and a working position. This step also comprises preparing a power generator 4, a pumping unit 5 and a control device 6.

In one embodiment, the method comprises a step of travelling to a work site using the motor vehicle. The work site is the place where the wheel to be serviced is located.

In one embodiment, the method comprises a step of tilting the frame 2 about the tilting axis Z from the rest position, where the frame 2 is positioned inside the vehicle, to the working position, where at least part of the frame 2 is positioned outside the vehicle. In one embodiment, where the frame 2 includes a supporting foot 203, the supporting foot 203, during the step of tilting, swings about a supporting hinge 203', tending to maintain a direction which is substantially parallel to the direction of the weight force. In one embodiment, the mass of the supporting foot 203 is unbalanced towards the free end of the supporting foot 203. In one embodiment, the step of tilting is accomplished by the hydraulic action of a tilting actuator 7—for example, a hydraulic cylinder—driven by the control device 6 with the aid of the pumping unit 5. In one embodiment, on completion of the step of tilting, the frame 2 protrudes from a rear door of the motor vehicle. In another embodiment, on completion of the step of tilting, the frame 2 protrudes from a side door of the motor vehicle.

In one embodiment, the method comprises a step of receiving and locking the wheel in place by means of a wheel-holder unit 204 connected to the frame 2. In one embodiment, this step of receiving is accomplished by manually moving the wheel close to the wheel-holder unit 204. During the step of receiving and locking the wheel in place, the wheel-holder unit 204, mounted on an arm 200 of the frame 2, is stationary relative to the frame 2, while the wheel is moved progressively closer to it. The wheel-holder unit 204, comprising a plurality of locking elements 204A, drives the locking elements 204A in such a way that they grip the rim and lock the wheel in place. In one embodiment, the method comprises a step of adapting the self-centring chuck 204' to the size of the wheel, chosen from a wide range of wheel sizes. In one embodiment, the method comprises a step of positioning an adapter and a built-in chuck. The step of adapting is followed by the step of receiving and locking the wheel in place on the built-in chuck. In one embodiment, the step of receiving and locking the wheel in place is carried out when the wheel-holder unit 204 is in the proximity of a free end of the arm 200.

In one embodiment, the method comprises a step of moving the wheel-holder unit 204 along the longitudinal axis having at least one component in a vertical direction, parallel to the direction of the weight force, in order to lift the wheel off the ground. In one embodiment, the wheel-holder unit 204 moves translationally along the longitudinal axis X on a longitudinal guide 201A. This step of moving translationally is accomplished by a longitudinal actuator 201C, driven by the control device 6.

In one embodiment, when the frame 2 is tilted from the rest position to the working position, the arm 200 rotates while remaining in a plane perpendicular to the tilting axis Z.

In one embodiment, the method comprises a step of moving a working unit 207 relative to the wheel-holder unit 204 along a transverse axis Y parallel to the tilting axis Z. In one embodiment, the working unit 207 moves translationally along the transverse axis Y on a transverse guide 205. This movement is accomplished by a transverse actuator: for example, a hydraulic cylinder. The movement continues until the tool 207B of the working unit 207 interacts with the tyre on the wheel.

In one embodiment, when the frame 2 is at the working position, the arm 200 rests on the ground by means of the supporting foot 203, at a stationary position relative to movements of the wheel-holder unit 204 and of the working unit 207 during such movements.

In one embodiment, the method comprises a step of dismounting the tyre from the respective rim.

In a further embodiment, the method comprises a step of mounting the tyre on the respective rim.

In one embodiment, during the step of dismounting the tyre from the respective rim, the distance of the wheel centre from the ground is less than the distance of the base 3 from the ground.

In one embodiment, the method comprises a step of replacing a tool 207B on the working unit 207.

The invention claimed is:

1. A tyre dismounting apparatus adapted to be installed on a motor vehicle, comprising:
   a base configured to be fixed to the motor vehicle;
   a frame, hinged to the base and tiltable about a tilting axis between a rest position and a working position, wherein the frame comprises an arm extending along a longitudinal axis, wherein, in the working position, the longitudinal axis has at least one component parallel to a weight force, and wherein the arm includes a longitudinal guide elongated along the longitudinal axis;
   a tilting actuator connected to the base and to the frame to move the frame relative to the base;
   a wheel-holder unit configured to receive a wheel and lock the wheel in place and rotate about an axis of rotation to drive the wheel in rotation about the axis of rotation, wherein the wheel-holder unit comprises a self-centring chuck, rotatable about the axis of rotation and configured to engage the wheel and lock the wheel in place, wherein the wheel-holder unit is coupled to the longitudinal guide;
   a longitudinal actuator connected to the frame and configured to move the wheel-holder unit by translation along the longitudinal guide; and
   a working unit connected to the frame and including a rod and a tool connected to the rod;
   wherein the tyre dismounting apparatus further comprises a transverse actuator connected to the working unit and configured to move the working unit translationally relative to the wheel-holder unit along a transverse axis parallel to the tilting axis of the frame; and
   wherein the frame comprises a supporting foot directly connected to the arm and configured to support a weight of the arm wherein, when the frame is in the working position, the supporting foot rests on a ground and supports the arm.

2. The apparatus according to claim 1, wherein the supporting foot is articulated to the frame to swing about an axis parallel to the tilting axis.

3. The apparatus according to claim 2, wherein the supporting foot has a fixed end, connected to the frame, and a free end, opposite to the fixed end, and a mass of the supporting foot is distributed in unbalanced manner towards the free end.

4. The apparatus according to claim 3, wherein the supporting foot is adjustable in length.

5. The apparatus according to claim 1, wherein the axis of rotation of the wheel-holder unit is parallel to the tilting axis.

6. The apparatus according to claim 5, wherein the arm lies in a working plane perpendicular to the tilting axis and wherein the longitudinal actuator is mounted on the arm.

7. The apparatus according to claim 1, wherein the frame comprises a crossbar extending along the transverse axis, parallel to the tilting axis and perpendicular to the longitudinal axis.

8. The apparatus according to claim 7, wherein the working unit is movably connected to the crossbar.

9. The apparatus according to claim 7, wherein the crossbar comprises the transverse actuator to drive the working unit translationally along the transverse axis.

10. The apparatus according to claim 7, wherein the crossbar includes a transverse guide and a transverse slide slidably coupled to the transverse guide and connected to the transverse actuator and wherein the working unit is mounted on the transverse slide.

11. The apparatus according to claim 10, wherein the crossbar comprises the transverse actuator, the transverse actuator includes a manual guide mounted on the transverse slide and wherein the working unit is movably connected to the manual guide to be driven transversely along the manual guide and to be rotated relative to the manual guide.

12. The apparatus according to claim 1, wherein the tool is removably connected to the rod of the working unit and wherein the tyre dismounting apparatus comprises an additional tool, the additional tool being interchangeable with the tool.

13. The apparatus according to claim 1, comprising a portable roller table, including:
    a supporting structure provided with elements configured to rest on the ground; and
    a plurality of rolling elements connected to the supporting structure and oriented in such a way that axes of rotation of the plurality of rolling elements are parallel to each other.

14. The apparatus according to claim 1, wherein the arm is elongated between a first end, connected to the base, and a second end, opposite to the first end, wherein the supporting foot is connected to the second end of the arm.

15. The apparatus according to claim 1, including a manual guide, elongated parallel to the transverse axis, wherein the working unit is movably connected to the manual guide to be moved transversely along the manual guide by a user, so that the working unit is movable along the transverse axis both by effect of an action of the transverse actuator, and by effect of a manual adjustment performed by the user.

16. A method for dismounting a tyre from a respective wheel rim, comprising the following steps:
    preparing a base, fixed to a motor vehicle, and a frame which is tiltable relative to the base about a tilting axis between a rest position and a working position, wherein the frame comprises an arm extending along a longitudinal axis, and wherein the arm includes a longitudinal guide elongated along the longitudinal axis;
    tilting the frame about the tilting axis from the rest position, where the frame is positioned inside the motor vehicle, to the working position, where at least part of the frame is positioned outside the motor vehicle, wherein in the working position, the longitudinal axis of the arm has at least one component parallel to a weight force;
    receiving and locking a wheel in place by means of a wheel-holder unit connected to the frame, wherein the wheel-holder unit comprises a self-centring chuck, rotatable about an axis of rotation, and configured to engage the wheel and lock the wheel in place;
    moving the wheel-holder unit by translation along the longitudinal guide, in order to lift the wheel off a ground; and
    moving a working unit, including a rod and a tool connected to the rod, relative to the wheel-holder unit along a transverse axis parallel to the tilting axis by means of a transverse actuator, in order to allow the tool of the working unit to interact with the tyre on the wheel;
    wherein the frame comprises a supporting foot directly connected to the arm and configured to support a weight of the arm, wherein when the frame is at the working position, the supporting foot rests on the ground and supports the arm.

17. The method according to claim 16, wherein the supporting foot, when the frame is at the working position, rests on the ground at a stationary position relative to movements of the wheel-holder unit and of the working unit during such movements.

18. The method according to claim 17, wherein, during the movement of the frame from the rest position to the working position, the supporting foot swings about an axis parallel to the tilting axis, under the action of the weight force.

19. The method according to claim 16, wherein the wheel-holder unit is connected to the arm, the wheel-holder unit having an axis of rotation parallel to the tilting axis, and wherein, during tilting of the frame from the rest position to the working position, the arm rotates while remaining in a plane perpendicular to the tilting axis.

20. A tyre dismounting apparatus adapted to be installed on a motor vehicle, comprising:
    a base configured to be fixed to the motor vehicle;
    a frame, hinged to the base and tiltable about a tilting axis between a rest position and a working position, wherein the frame comprises an arm extending along a longitudinal axis, wherein, in the working position, the longitudinal axis has at least one component parallel to a weight force, and wherein the arm includes a longitudinal guide elongated along the longitudinal axis;
    a tilting actuator connected to the base and to the frame to move the frame relative to the base;
    a wheel-holder unit configured to receive a wheel and lock the wheel in place and rotating about an axis of rotation to drive the wheel in rotation about the axis of rotation, wherein the wheel-holder unit comprises a self-centering chuck, rotatable about the axis of rotation and configured to engage the wheel and lock the wheel in place, wherein the wheel-holder unit is coupled to the longitudinal guide;
    a longitudinal actuator connected to the frame and configured to move the wheel-holder unit by translation along the longitudinal guide;

a working unit connected to the frame and including a rod and a tool connected to the rod, wherein the tyre dismounting apparatus further comprises a transverse actuator connected to the working unit and configured to move the working unit translationally relative to the wheel-holder unit along a transverse axis parallel to the tilting axis of the frame; and wherein the frame comprises a supporting foot connected to the arm, wherein, when the frame is in the working position, the supporting foot rests on a ground and supports the arm, wherein the frame comprises a crossbar extending along the transverse axis, parallel to the tilting axis and perpendicular to the longitudinal axis, wherein the crossbar includes a transverse guide and a transverse slide slidably coupled to the transverse guide and connected to the transverse actuator, wherein the working unit is mounted on the transverse slide, and wherein the crossbar further comprises the transverse actuator, the transverse actuator including a manual guide mounted on the transverse slide and wherein the working unit is movably connected to the manual guide to be driven transversely along the manual guide and to be rotated relative to the manual guide.

\* \* \* \* \*

UNITED STATES PATENT AND TRADEMARK OFFICE
CERTIFICATE OF CORRECTION

PATENT NO. : 11,059,334 B2
APPLICATION NO. : 15/982430
DATED : July 13, 2021
INVENTOR(S) : Giulio Corghi Page 1 of 1

It is certified that error appears in the above-identified patent and that said Letters Patent is hereby corrected as shown below:

In the Claims

Column 13, Line 24 delete "actuator to drive" and insert --actuator configured to drive--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*